Figure 3:
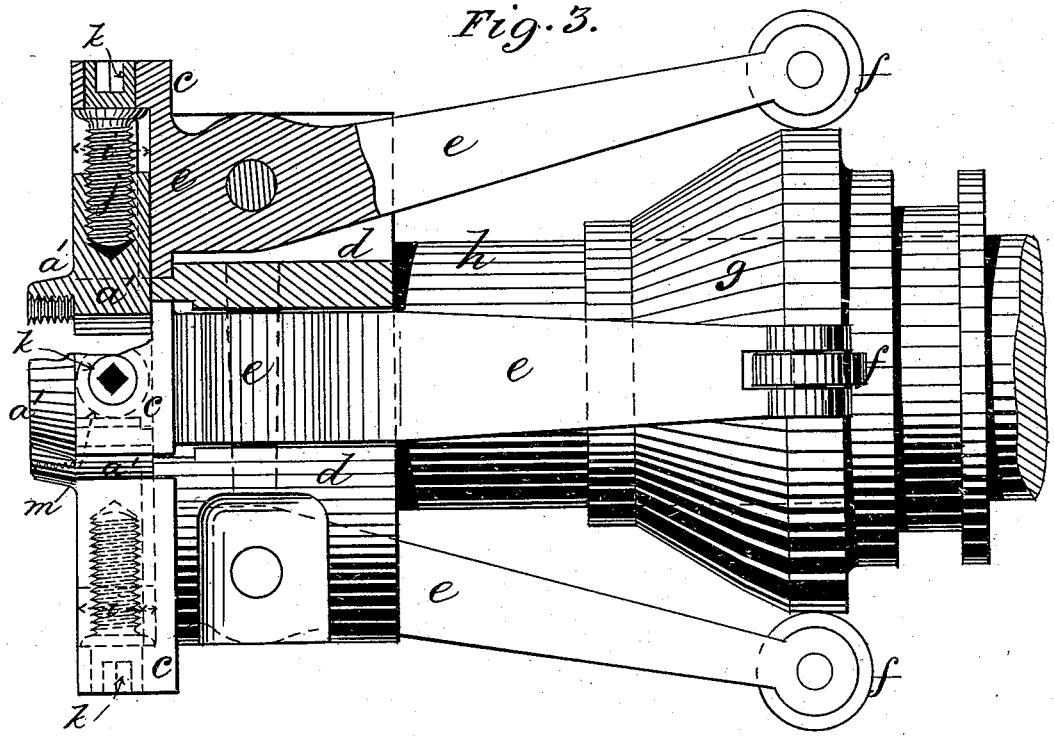

(No Model.)  M. C. BIGNALL.  2 Sheets—Sheet 1.
PIPE AND NIPPLE GRIPPING CHUCK.
No. 393,093. Patented Nov. 20, 1888.
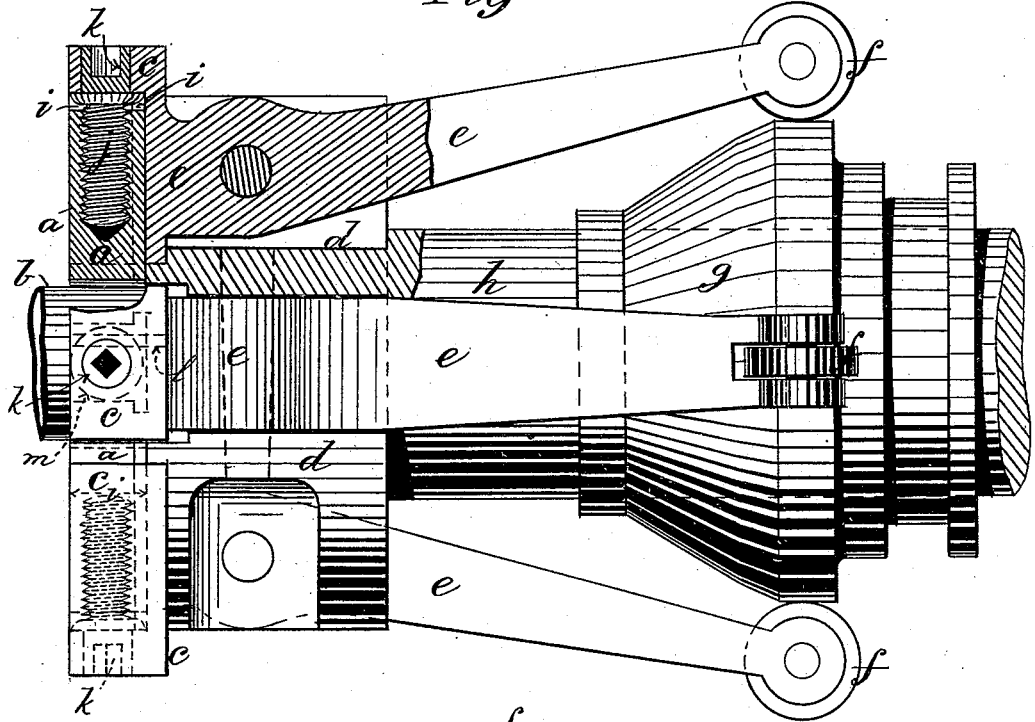
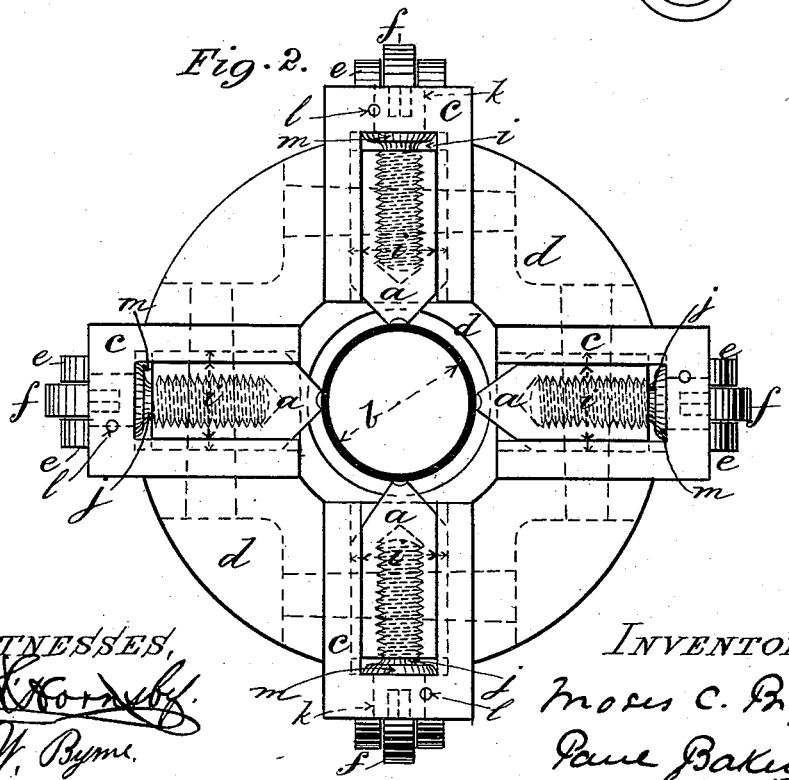

(No Model.) 2 Sheets—Sheet 2.

M. C. BIGNALL.
PIPE AND NIPPLE GRIPPING CHUCK.

No. 393,093. Patented Nov. 20, 1888.

WITNESSES
J. L. Hornsby
W. Byrne

INVENTOR,
Moses C. Bignall,
by Paul Bakewell
his attorney.

United States Patent Office.

MOSES C. BIGNALL, OF ST. LOUIS, MISSOURI, ASSIGNOR TO THE BIGNALL & KEELER MANUFACTURING COMPANY, OF SAME PLACE.

PIPE AND NIPPLE GRIPPING CHUCK.

SPECIFICATION forming part of Letters Patent No. 393,093, dated November 20, 1888.

Application filed June 4, 1888. Serial No. 275,912. (No model.)

*To all whom it may concern:*

Be it known that I, MOSES C. BIGNALL, a citizen of the United States, residing at the city of St. Louis, in the State of Missouri, have invented a certain new and useful Improvement in Pipe and Nipple Gripping Chucks, of which the following is a full, clear, and exact description.

My invention relates to improvements in that class of pipe and nipple gripping chucks in which the carriers or holders of the jaws or grippers are separate from and moved inward by the pivoted levers toward and at right angles to the horizontal center line of the chuck for gripping the pipe or nipple, the levers being operated by a sliding cone on the spindle of the machine; and my invention has for its object to obtain a firmer grip on the pipe or nipple, and in the case of the nipple a quicker removal thereof when the grip is released; to enable all or either of the jaws or grippers to be readily and accurately adjusted or tightened to different-sized pipes, or to any inequality in the surface of the pipe after the grip has been effected by the cone and levers, and to use a single chuck for gripping either a pipe or nipple, in lieu of a separate chuck in each case, as heretofore.

It consists in the use of jaws or grippers, preferably four in number, fitted and capable of longitudinal adjustment by means of screws within their carriers or holders, which are formed in one piece, respectively, with the levers, in lieu of being separate from the latter, as heretofore, the levers being pivoted to the chuck and operated by the sliding cone on the spindle of the machine in the usual manner.

On the accompanying drawings, Figure 1 represents a sectional longitudinal elevation of my improved gripping-chuck and its appendages, broken away when used as a pipe-gripper; Fig. 2, a front view thereof; and Figs. 3 and 4, similar views, respectively, of the same when used as a nipple-gripper, like letters of reference denoting like parts in all the figures.

Referring to Figs. 1 and 2, $a$ represents the jaws or grippers, preferably four in number, of my improved pipe-gripping chuck, the said grippers $a$ being fitted radially to the pipe $b$ at right angles to each other within the carriers or holders $c$, which are arranged in front of the head $d$ of the chuck and formed in one piece, respectively, with the front ends of the levers $e$, which are pivoted in the head $d$ and carried by the chuck, the rear ends of the levers $e$ being coupled together by springs (not shown) and provided with rollers $f$ for riding over the cone $g$, which surrounds the spindle $h$ and is moved to and fro along the latter for operating the levers $e$ in the usual manner.

The jaws or grippers $a$ are provided at their rear edges with lateral ribs or flanges, and are fitted within grooved recesses $i$, formed longitudinally in the faces of the carriers or holders $c$, said recesses corresponding to the shape of the jaws. The jaws thus constructed can be adjusted longitudinally in the recesses $i$ by means of adjusting-screws $j$, which engage an internal screw-thread in the outer ends of the jaws or grippers $a$, the shanks $k$ of said adjusting-screws passing through circular openings in the outer ends of the carriers or holders $c$, and held from longitudinal movement therein by means of pins $l$ and shoulders $m$ on the screw, the pins $l$ bearing against said shoulders $m$ of the screw, thereby holding it in contact with the wall of the recess $i$, so that on rotating the screws $j$ in either direction by the shanks $k$ the jaws or grippers $a$ are moved to or from the pipe $b$, as required. The outer end of the shank $k$ is flush with the outer end of the carrier or holder $c$, and is provided with an angular recess adapted to receive a correspondingly-shaped key for rotating the screw. By this arrangement, on the cone $g$ being moved along the spindle $h$ by its clutch in the usual manner for diverging the rear arms of the levers $e$, the carriers or holders $c$ at the front ends of the levers $e$, with the jaws of the grippers $a$, are converged toward the pipe $b$ in the direction of their arc of vibration from the pivots of the levers $e$, whereby the rear portions of the closing or gripping edges of the jaws or grippers $a$ are caused to bite into and grip the pipe $a$ somewhat in advance of and therefore to a greater extent than the front portions of the said edges, and the pipe $b$ is thereby held more firmly than when the grippers close upon the pipe at right angles, as hitherto. To increase the gripping force as the grippers *a* are closing upon the pipe *b*, the inclination of the cone *g* at its highest part is lessened, so as to gain more power thereat on the levers *e*.

By turning the screws *j*, and so moving the jaws or grippers *a* along their carriers or holders *c* to or from the center of the chuck, the jaws or grippers *a* are readily and speedily adjusted to different-sized pipes.

By the use of four jaws or grippers *a*, in lieu of two, as usual, the pipe *b* is set truer as the grippers *a* close thereon.

Figure 4:
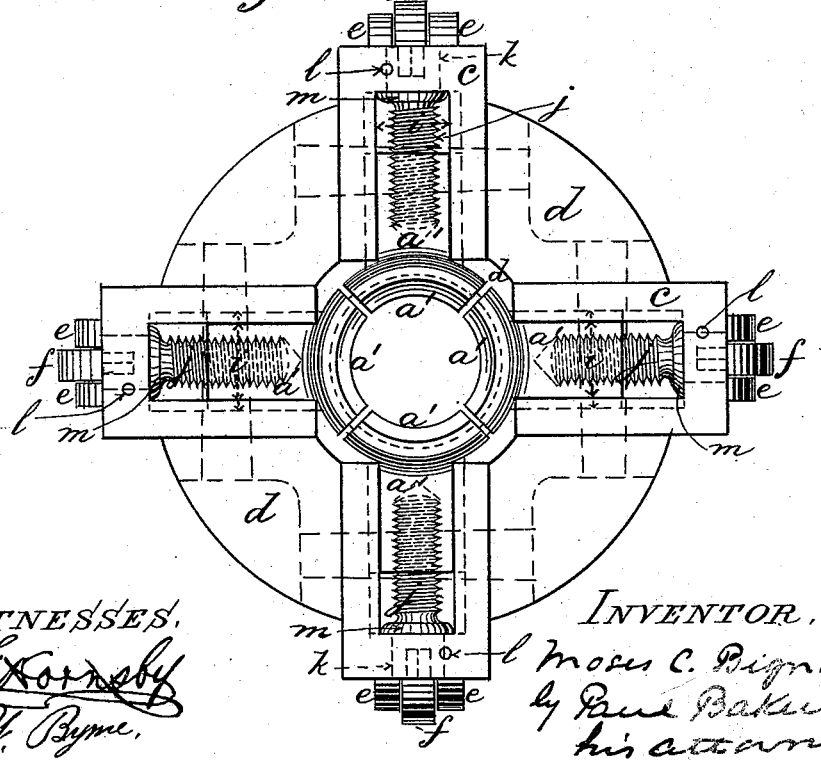

Figures 3 and 4 illustrate my invention when used as a nipple-gripper, in which case the flanged guided portions of the nipple-jaws or grippers *a'* are made of the same size as the corresponding parts of the pipe or grippers *a* above described, which are removed from their guides *i* in the carriers or holders *c* and the nipple-grippers *a'* substituted, the head *d* and other parts of the chuck remaining the same as for the pipe-gripping chuck seen in Figs. 1 and 2, whereby a single chuck can be used for both purposes, which is of great advantage for saving time and labor in changing the parts as heretofore necessary.

If in consequence of any irregularity in the surface of the pipe *b*, Figs. 1 and 2, either of the jaws or grippers *a* does not fully grip the pipe after the entire series of jaws or grippers *a* have been closed thereon by the levers *e*, it can be tightened up against the pipe *b* by turning its screw *j*, so as to move the jaw or gripper in the required direction. Or, on the other hand, should a nipple be smaller than the standard size to which the jaws or grippers *a'*, Figs. 3 and 4, have been set, the difference in size can be taken up and the nipple firmly gripped by turning their screws *j*, so as to move the entire series of jaws or grippers *a'* toward the center of the chuck.

By the use of four nipple-grippers, *a'*, the gripping strain on the nipple is more distributed, and the nipple in consequence does not set so fast and is more easily removed from the chuck when the grip is released.

I am aware that it is old in screw-cutting machines to mount the dies adjustably in the short arm of pivoted levers and secure the same therein by means of bolts and set-screws; but I am not aware that such dies or gripping-jaws have ever been adjustably mounted in guide-recesses in the short arms of the pivoted levers, so as to be positively operated in both directions by means of a single screw.

I claim as my invention—

1. The combination, in a gripper or chuck, of a series of parallel pivoted levers, a series of radial slides mounted therein, and adjusting-screws arranged to rotate in said levers and positively adjust the slides in both directions, substantially as and for the purposes set forth.

2. In a pipe and nipple gripping chuck, the combination, with the spindle, of a head mounted thereon, levers pivoted in said head, having recesses in the short arms thereof, gripper-jaws provided with flanges adapted to fit in said grooved recesses, a screw for positively adjusting said gripping-jaws in both directions, and a cone for operating the levers, substantially as and for the purposes described.

3. In a pipe and nipple gripping chuck, the combination, with the head, of levers pivoted therein, having recesses in the short arms thereof and anti-friction rollers in their long arms, gripping-jaws fitting in said recesses, a screw for positively adjusting said jaws in both directions, and a cone for operating said levers, substantially as and for the purposes described.

In testimony whereof I affix my signature, in presence of two witnesses, this 24th day of May, 1888.

MOSES C. BIGNALL.

Witnesses:
S. L. SCHRADER,
PAUL BAKEWELL.